United States Patent
Nast

(10) Patent No.: US 8,406,820 B2
(45) Date of Patent: Mar. 26, 2013

(54) RADIO TRANSMISSION SIGNAL DETECTION CIRCUIT

(75) Inventor: Helmut Nast, Berlin (DE)

(73) Assignee: Funkwerk Dabendorf GmbH, Dabendorf (DE)

( * ) Notice: Subject to any disclaimer, the term of this patent is extended or adjusted under 35 U.S.C. 154(b) by 252 days.

(21) Appl. No.: 13/054,156

(22) PCT Filed: Jul. 10, 2009

(86) PCT No.: PCT/DE2009/050036
§ 371 (c)(1),
(2), (4) Date: Jan. 14, 2011

(87) PCT Pub. No.: WO2010/006596
PCT Pub. Date: Jan. 21, 2010

(65) Prior Publication Data
US 2011/0116422 A1    May 19, 2011

(30) Foreign Application Priority Data
Jul. 14, 2008    (DE) .......................... 10 2008 040 395

(51) Int. Cl.
*H04M 1/00*    (2006.01)
(52) U.S. Cl. .................................................. 455/569.1
(58) Field of Classification Search .................. None
See application file for complete search history.

(56) References Cited

U.S. PATENT DOCUMENTS

| | | |
|---|---|---|
| 5,507,016 A | 4/1996 | Okuhara |
| 6,175,748 B1 | 1/2001 | Aboukhalil et al. |
| 6,230,031 B1 | 5/2001 | Barber |
| 6,892,080 B2 | 5/2005 | Friesen et al. |
| 7,133,652 B2 * | 11/2006 | Nast et al. ..................... 455/129 |
| 2003/0100351 A1 | 5/2003 | Friesen et al. |
| 2006/0165022 A1 * | 7/2006 | Nast et al. ..................... 370/310 |
| 2007/0281631 A1 * | 12/2007 | Nast ................................ 455/99 |
| 2010/0291915 A1 * | 11/2010 | Nast et al. ..................... 370/278 |
| 2012/0170519 A1 * | 7/2012 | Nast et al. ..................... 370/328 |

FOREIGN PATENT DOCUMENTS

| | | |
|---|---|---|
| DE | 195 36 640 A1 | 3/1997 |
| DE | 102006010963 A1 | 9/2007 |
| EP | 0 594 153 A2 | 4/1994 |
| EP | 1 841 083 A2 | 10/2007 |

* cited by examiner

*Primary Examiner* — Anh-Vu Ly
(74) *Attorney, Agent, or Firm* — Laurence A. Greenberg; Werner H. Stemer; Ralph E. Locher

(57) ABSTRACT

A detection circuit has a detector unit for detecting a transmitted signal from a mobile radio terminal. The detection circuit forms a part of a circuit arrangement for processing or influencing received signals and transmitted signals associated with the mobile radio terminal (accessory circuit). It is involved in the accessory circuit via a switching means, which is arranged in a transmission path upstream of at least one transmission power amplifier which can be activated upon detection of a transmitted signal, and is coupled to the transmission path via a coupling element which is arranged downstream of the transmission power amplifier. At the start of the transmission burst, the whole power of the transmitted signal is first of all supplied to the detector unit before said detector unit changes over the transmitted signal to the transmission power amplifier by operating the switching means. The detection circuit has a self-hold function, so that the detector unit leaves the accessory circuit in its operating state which is provided for the presence of a transmitted signal, even after the switching means has been changed over, at least until the transmission power amplifier has completed the circuit and the component of the amplified transmitted signal which is coupled out by means of the coupling element is applied to the detector unit.

9 Claims, 3 Drawing Sheets

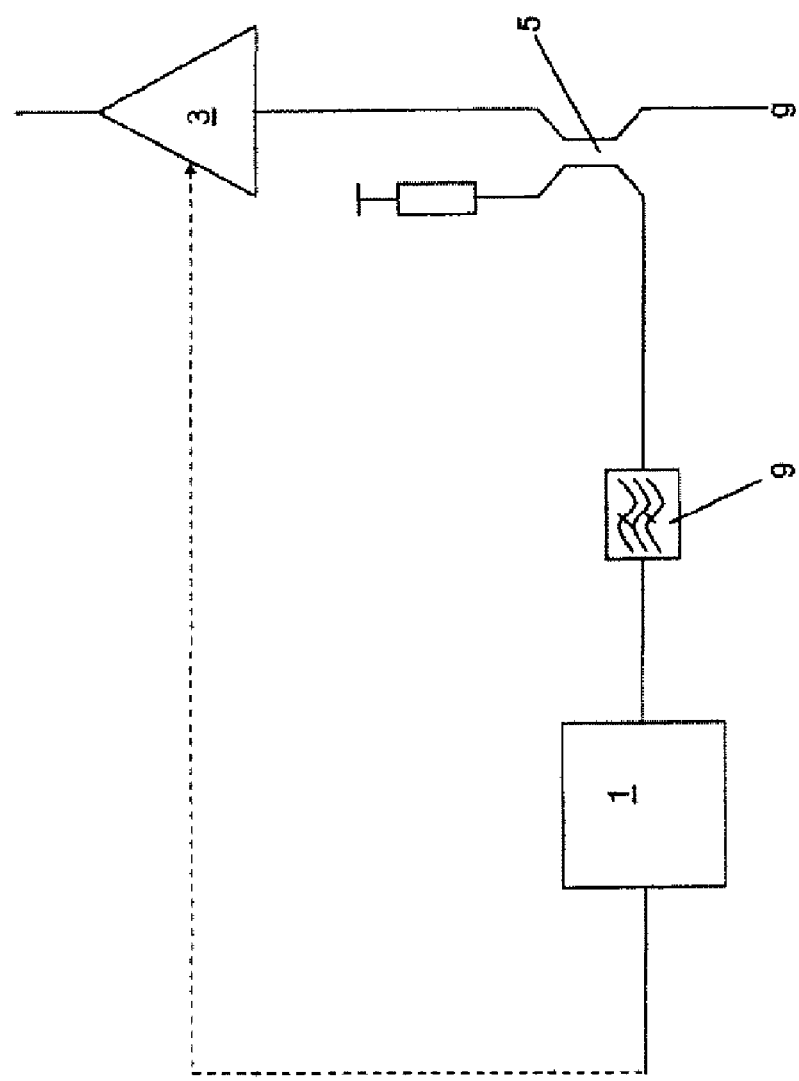

RADIO TRANSMISSION SIGNAL DETECTION CIRCUIT

BACKGROUND OF THE INVENTION

Field of the Invention

The invention relates to a detection circuit, namely a circuit arrangement having a detector unit for detecting the transmitted signal from a mobile radio terminal, which is provided for use as part of a circuit arrangement which is used for processing or influencing received signals arriving on the mobile radio terminal and transmitted signals departing from the mobile radio terminal and in which, to this end, when prompted by the detection circuit, the received signals, on the one hand, and the transmitted signals, on the other hand, are routed via different circuit paths and/or different units.

In connection with the use of hands-free devices, particularly for the operation of mobile radio terminals in a motor vehicle, circuit arrangements have been disclosed and are in use which compensate for the attenuation which occurs between an external antenna and the mobile radio terminal operated using the hands-free device. The attenuation to which both received mobile radio signals on their way from the external antenna to the mobile radio terminal and transmitted signals transmitted by the mobile radio terminal on their way to the external antenna are subject is compensated for, in respect of received signals, by means of appropriate, in some cases more readily broadband reception amplifiers and, in respect of the transmitted signals, by means of band-limited power amplifiers. In this case, it is known for the gain for compensating for the occurring attenuation to be adjusted or regulated dynamically so as to match it to the respective circumstances which actually exist in respect of the attenuation when the circuit is being operated. A circuit arrangement with dynamic control of the gain which compensates for the attenuation is disclosed by US 2003/0100351 A1, for example. The circuit arrangement described in the document is used particularly for dynamically adjusting the attenuation compensation in the transmitted signals. To this end, a transmission path in the circuit contains detectors, arranged upstream and downstream of the amplifier(s) used for amplifying the transmitted signal from a mobile telephone, which are each used to ascertain the level of a portion of the transmitted signal that is output from the transmission path by means of directional couplers. A special circuit unit for gain control evaluates the respective levels of the transmitted signal that are ascertained by means of the detectors and actuates the amplifiers in the transmission path accordingly, wherein the portion of the transmission power which is output following the amplification is used to limit the gain in the power path to a maximum value. A comparable circuit arrangement is described by U.S. Pat. No. 6,175,748 B1.

To reduce the influence on the transmission and reception channels, it is also known practice, in circuit arrangements which are used to compensate for the attenuation, to changeover each of the signal paths such that received signals are supplied to the relevant reception amplifier provided for amplifying them and transmitted signals coming from the mobile radio terminal are supplied to a respective transmission power amplifier. To ensure this, appropriate circuit arrangements for compensating for attenuation therefore comprise detection circuits which detect the transmitted signal from a mobile radio terminal operated using the circuit arrangement and provide control signals which prompt appropriate switching means to take the presence of a transmitted signal or the absence of a transmitted signal as a basis for changing over the signal paths of the circuit arrangement such that the signals passing through the circuit arrangement are each routed via the correct circuit path.

In the circuit arrangements of the prior art, said detection circuits are arranged directly on the appliance side, that is to say directly on a connection of the circuit arrangement for compensating for attenuation that is provided for the purpose of connection to the mobile radio terminal. In this case, they comprise at least one line coupler or RF coupler through which received signals can pass, that is to say which is transparent, but which outputs a portion of a transmitted signal coming from the mobile radio terminal and supplies it to a detector unit. By way of example, the detector unit is a threshold value switch which, when a signal which is situated above the threshold value is present, delivers the control signals which are required for changing over the signal paths for the transmission mode. Circuit arrangements of the type in question for compensating for the attenuation which occurs between an external antenna and a mobile radio terminal which is operated on the external antenna are disclosed by DE 195 36 640 A1 and DE 10 2006 010 963 A1, for example. In this context, DE 195 36 640 A1 relates to an appropriate circuit arrangement for operating within a mobile radio band, particularly in the GSM network or in a DCS network, while DE 10 2006 010 963 A1 relates to a circuit arrangement with multiband capability. According to both solutions, the occurrence of a transmitted signal from a mobile radio which is operated using the circuit arrangement is detected from a portion of the signal which is to be supplied to the transmission path of the circuit and which is output by means of an RF coupler or a line coupler at the appliance-side input of the circuit. Particularly in the case of circuit arrangements of the type in question, which, like those based on DE 10 2006 010 963 A1, are also designed for operation with mobile radio terminals operating on the basis of the UMTS standard, it has been found, however, that the comparatively low transmission power in the UMTS standard means that a transmitted signal is not always identified reliably. This stems from the fact that the aforementioned RF coupler outputs only a portion of the transmission power of the transmitted signal coming from the mobile radio terminal for the purpose of detection, since the aim is naturally to route the largest possible portion of the transmission power as a useful signal via one of the circuit paths provided for the transmission of signals. If, furthermore, attenuation losses occur in the region of the coupling of the mobile radio terminal to the relevant circuit arrangement, the level of the portion of a transmitted signal which is supplied to the detector unit, that is to say to the threshold value switch, may, in individual cases, be so small that it is below the set threshold value and hence the signal is no longer identified as a transmitted signal.

Increasingly, mobile radio terminals are also connected to the accessory circuits used for the operation thereof no longer by a direct electrical connection but rather by means of electromagnetic coupling, since modern mobile radio terminals frequently have no provision for direct electrical connection for the RF antenna signal. This means that, in individual cases, with particularly poor coupling circumstances between the circuit arrangement for compensating for attenuation and the mobile radio terminal, even the operation of mobile radio terminals operating on the basis of the GSM standard and hence at a higher transmission power may involve the level which is present on the detector unit in the transmission mode of the mobile radio terminal being below the threshold value, so that transmitted signals from the mobile radio are not reliably identified.

BRIEF SUMMARY OF THE INVENTION

It is therefore an object of the invention to provide a circuit arrangement for detecting a transmitted signal which is part of a circuit arrangement for processing or influencing received signals arriving on mobile radio terminals and transmitted signals departing from said terminals, for example part of a circuit arrangement for compensating for attenuation, and to design it such that the selectivity and the reliability of the detection of a transmitted signal coming from the mobile radio terminal is increased.

The object is achieved by a detection circuit having the features of the main claim. Advantageous forms and developments of the invention are provided by the subclaims.

The circuit arrangement proposed for achieving the object has a detector unit for detecting a transmitted signal and, in line with the object, is in the form of part of a more complex circuit arrangement which is used for processing or influencing mobile radio signals which are supplied to a mobile radio terminal operated using said circuit arrangement or are transmitted by the relevant mobile radio terminal. In view of each electronic circuit being a special arrangement of components and electronic functional units and hence being a circuit arrangement, the short form "detection circuit" will subsequently be used for the circuit arrangement according to the invention by way of simplification. In this context, the term "detection circuit" relates both to the nature of the circuit arrangement as determined by the composition of the components and functional units which form the relevant circuit arrangement and to the arrangement of said circuit arrangement within the more complex circuit arrangement for processing or influencing received and transmitted signals from a mobile radio terminal. For the purposes of distinction from the detection circuit and likewise by way of shortening, the latter circuit arrangement will subsequently be called an "accessory circuit". By way of example, this is a circuit arrangement for compensating for attenuation, but the invention is not limited to a detection circuit in the form of part of such circuit arrangements.

When prompted by the detection circuit or the detector unit thereof, the aforementioned accessory circuit is switched to various operating states. This is preferably done by operating switching means arranged in the accessory circuit and/or by switching individual function groups on and off. In line with one of these operating states, detection of a transmitted signal from the mobile radio terminal operated using the accessory circuit prompts the activation of a circuit portion of the accessory circuit in which the transmitted signal is routed via at least one activated transmission power amplifier which is used for amplifying said transmitted signal. In the absence of a transmitted signal, on the other hand, the aforementioned transmission power amplifier is in a deactivated state. In this case, the transmission power amplifier is activated by including the circuit path in which it is arranged in the signal paths and/or by switching on the transmission power amplifier for RF signals and, correspondingly conversely, is deactivated by breaking a connection in this circuit path and/or switching off the transmission power amplifier for RF signals.

In order to improve the selectivity and the reliability of the detection of the transmitted signal, the detection circuit is, in line with the invention, included in the accessory circuit via a switching means which is arranged in a transmission path upstream of the at least one transmission power amplifier that is to be activated when a transmitted signal is detected. Furthermore, the invention provides for said detection circuit to be coupled to the aforementioned transmission path of the accessory circuit via a coupling element which, from the point of view of the mobile radio terminal, is arranged downstream of the relevant transmission power amplifier. The detection circuit is designed and arranged such that the transmitted signal is supplied first of all not to the transmission power amplifier but rather via the relevant switching means to the detector unit at the start of the transmission burst on account of an appropriate switching state of the switching means which is operated by the detector unit and includes it in the accessory circuit. Only when the transmitted signal is detected by the detector unit is the aforementioned switching means changed over by the detector unit and then the transmitted signal supplied to the transmission power amplifier. So that the accessory circuit maintains its operating state for the duration of the transmission burst, even though the transmitted signal is now no longer supplied to the detector unit via the switching means arranged upstream of the transmission power amplifier, the detection circuit is designed such that it has a self-holding function. In addition, the incorporation of the detection circuit into the accessory circuit is such that, as already explained, it is coupled, via a coupling element, downstream of the transmission power amplifier which is to be activated when the transmitted signal is detected and, in this context, a line coupler is preferably used to supply a portion of the output power of the transmitted signal which is present at the output of the transmission power amplifier to the detector unit. This ensures that the detection circuit, having first of all held itself, subsequently continues to recognize the presence of a transmitted signal. In this case, that portion of the transmitted power which is output via the line coupler connected downstream of the transmission power amplifier is large enough, on account of the prior amplification, in order to be safely identified as a transmitted signal by the detector unit to which it is supplied.

If, in the further course of time, the mobile radio terminal does not transmit another transmitted signal and the detector unit therefore does not detect another transmitted signal, the switching means arranged upstream of the transmission power amplifier and possibly further switching means arranged in the accessory circuit are changed over by the detector unit to another switching state again in which the accessory circuit again adopts its original operating state and hence the transmission power amplifier is in a deactivated state.

The invention accordingly improves the reliability of the recognition of a transmitted signal coming from the mobile radio terminal by virtue of the detector unit not, as on the basis of the prior art, only being supplied with a fraction of the initially still unamplified transmitted signal but also, at the start of the transmission burst, the entire transmission power, as it were, of the mobile radio terminal initially being present on the detector unit and being used for the detection process and, thereafter, a portion of the transmitted signal amplified by the transmission power amplifier being supplied to the detector unit, which portion has, on account of the prior amplification, a significantly higher level than the portion which is output from the unamplified transmitted signal in accordance with the prior art.

In one particularly advantageous refinement of the detection circuit according to the invention, the coupling element connected downstream of the output of the transmission power amplifier and the detector unit have a further switching means arranged between them which is operated by the detector unit such that there is a direct electrical connection between the coupling element and the detector unit only in the presence of a transmitted signal, detected by the detection circuit, from the mobile radio terminal operated using the accessory circuit. This further increases the reliability of the detection.

In line with an embodiment which is provided particularly for accessory circuits for operation with mobile radio terminals operating in duplex mode, the detection circuit has been inserted into the relevant accessory circuit on the appliance side, that is to say in the region of the output of the mobile radio terminal, between a duplexer which isolates the transmitted and received signals and the transmission power amplifier that is to be activated by the detection circuit when a transmitted signal appears, by an appropriate switching means which is operated by said detection circuit.

The self-holding of the detection circuit can be achieved by means of various measures. In line with one possible embodiment, the detection circuit has a timing element (for example a capacitor which discharges only gradually or a delay line) which maintains the operating state adopted by the accessory circuit at the start of the transmission burst for a prescribed period in all cases. In this case, the relevant period naturally needs to be set on the timing element such that the transmission power amplifier has safely turned on in the meantime and the transmitted signal which is output in the region of the output of the transmission power amplifier is present at the input of the detector unit. The timing element may possibly be a direct integral part of the detector unit.

In line with one particularly advantageous development of the detection circuit, the detector unit thereof is in the form of a field strength meter with a threshold value function. In this embodiment, the basic state of the accessory circuit, in which the transmission power amplifier is in a deactivated state and the detector unit is connected to the output of the mobile radio terminal via the switching means arranged upstream of the transmission power amplifier and possibly via the available duplexer, is adopted again as soon as the portion of the transmitted signal which is output on the output side of the transmission power amplifier falls below a prescribed level. In this context, a design in which the detection circuit has a hysteresis of approximately 3 dB has been found to be expedient. This means that as soon as the portion of the transmitted signal which is output on the output side of the transmission power amplifier is situated more than 3 dB below the level of the transmitted signal which is supplied to the detector unit at the start of the transmission burst via the switching means arranged upstream of the transmission power amplifier, the transmission power amplifier is deactivated again by the detector unit.

Details of the invention will be illustrated again below with reference to exemplary embodiments. In the associated drawings:

BRIEF DESCRIPTION OF THE SEVERAL VIEWS OF THE DRAWING

FIG. 3 shows a detection circuit of the generic type based on the prior art.

DESCRIPTION OF THE INVENTION

Figure 1:
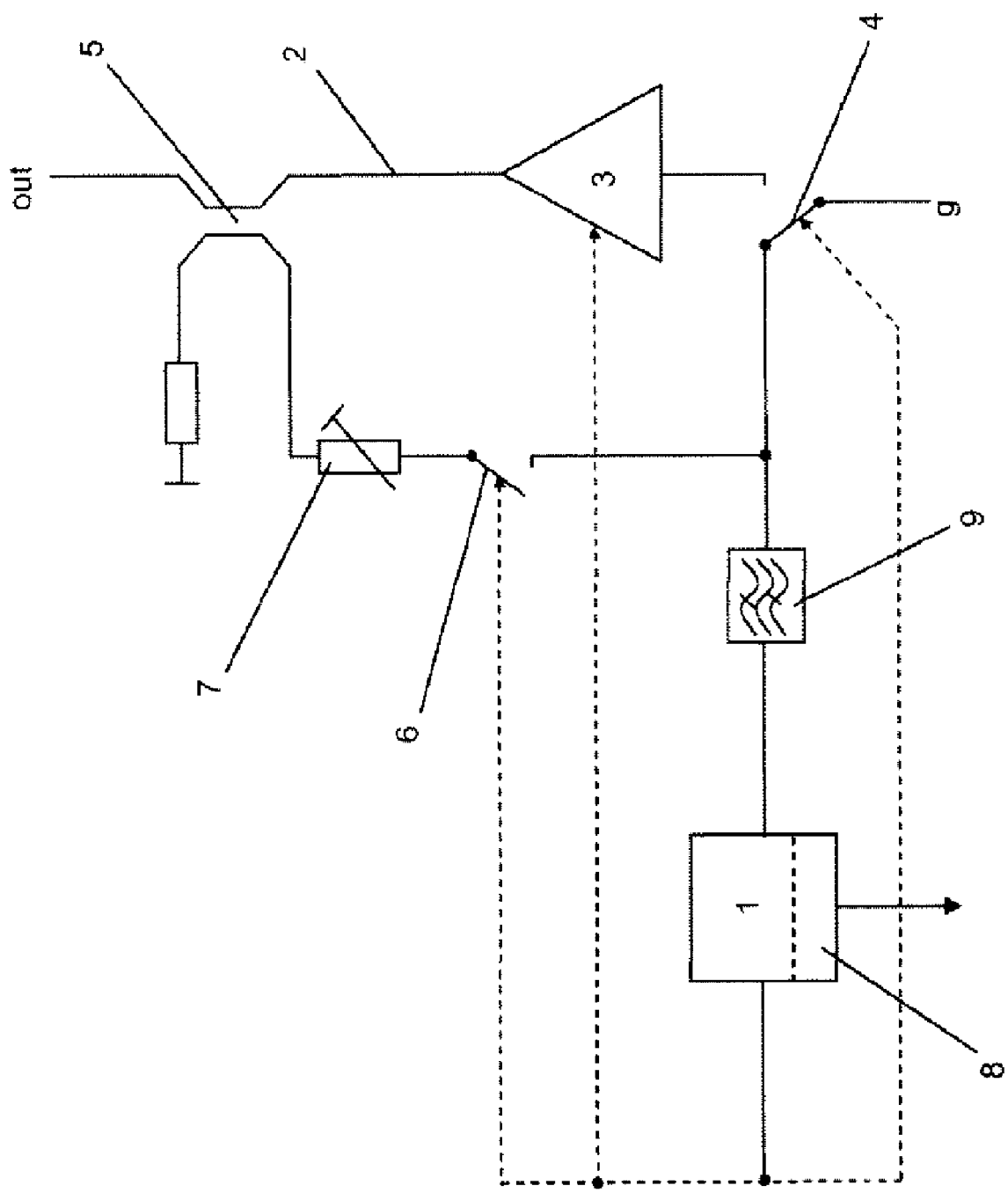
FIG. 1 shows the detail from a possible embodiment of the detection circuit according to the invention.

FIG. 1 shows the detail from a possible embodiment of the detection circuit according to the invention and the integration thereof into the transmission path 2 of a circuit arrangement (accessory circuit) which can be used to operate a mobile radio terminal for the purpose of using an external antenna and for the purpose of compensating for the attenuation which occurs in this case in the signal paths between the external antenna and the mobile radio terminal. In this case, the figure shows only a portion of a transmission path 2 in such an accessory circuit with a transmission power amplifier 3 arranged therein. The design of this accessory circuit requires various circuit portions, that is to say reception and transmission paths of the accessory circuit, to be activated or deactivated on the basis of the presence of a transmitted signal from the mobile radio terminal (not shown) which is being operated using said accessory circuit. In this respect, it is necessary to detect a transmitted signal coming from the mobile radio terminal, that is to say on the appliance side.

The detection circuit which, as stated, forms a portion of such an accessory circuit, is used—in line with the example shown in FIG. 1—to control or operate the switching means 4, 6 and to connect or to activate the transmission power amplifier 3 in the presence of a transmitted signal, and to disconnect it in the absence of a transmitted signal, that is to say to put it out of operation for the amplification of RF signals. In this case, FIG. 1 shows only a detail from a possible embodiment of the detection circuit according to the invention to the extent that there may be further switching means—not shown in the illustration—in the accessory circuit which are operated by the detector unit 1 of the detection circuit. Consequently, the figure may also not show further control or operative connections coming from the detector unit 1, as are shown as dashed lines for the transmission power amplifier 3 and the switching means 4, 6.

In a manner which is fundamental to the invention, the detection circuit with the detector unit 1 is inserted upstream of the transmission power amplifier 3, relative to the mobile radio (not shown) that is to be connected on the appliance side, via a switching means 4 and is coupled to the transmission path 2 of the accessory circuit downstream of the transmission power amplifier 3 via a coupling element 5. In this case, the switching means 4—an RF switch which is shown only symbolically in the figure by the symbol for a DC switch—is controlled by the detector unit 3. In the reception state or basic state of the accessory circuit equipped with the detection circuit according to the invention, said switching means 4 adopts the switching state shown in FIG. 1. In this case, the mobile radio terminal connected on the appliance side is connected directly to the detector unit 1 via the switching means 4 and a filter 9. When a transmitted signal is transmitted by the mobile radio terminal, the transmitted signal is sent directly to the input of the detector unit 1 at the start of the transmission burst on account of this switching state of the switching means 4. The detector unit 1 detects the presence of the transmitted signal. It then operates the switching means 4, 6 (and possibly further switching means of the accessory circuit, which are not shown) to adopt a transmission mode of operation or transmission operating state. When they have been operated, the switching means 4, 6 are used firstly to supply the transmitted signal from the mobile radio terminal to the transmission power amplifier 3 and secondly to connect the coupling element 5 to the detector unit 1 via the filter 9 using a direct electrical connection. At the same time, detection of the transmitted signal activates the transmission power amplifier 3, that is to say switches it on for the purpose of amplifying RF signals, via a control line, which is indicated by a dashed line in the figure. So that the detector unit 1 does not interpret the brief isolation—linked to the changeover of the switching means 4—of the transmitted signal which is transmitted by the mobile radio terminal as termination of the transmission process, the detection circuit is equipped with a self-hold function which, for example as indicated in the drawing, is implemented by an appropriate functional unit 8 within the detector unit 1. This is a timing element or delay element by means of which the detection circuit or the detector unit 1 thereof retains its control signals, which are based on the presence of a transmitted signal, on the output side for a very short period even if no transmitted signal is present on the detector unit 1 within this short period on account of the changeover of the switching means 4. Directly after the changeover of the switching means 4 and the start-up of the transmission power amplifier 3, the latter turns on, so that the output side of the transmission power amplifier 3 has the amplified transmission power applied to it, a portion of which is output via the line coupler 5 and routed to the input of the detector unit 1 via the switching means 6 and the filter 9.

The actuating element 7, an adjustable attenuation element, is used to set a hysteresis for the detection circuit such that the switching means 4, 6 operated by the detector unit 1 again adopt the switching state which corresponds to the reception mode as soon as the signal level on the detector unit 1 is situated more than 3 dB below the level of the transmitted signal detected at the start of the transmission burst. The entire circuit arrangement is then switched to reception mode and in this context the transmission power amplifier 3 is also disconnected via the detector unit 1. As a result of the fact that, at the start of the transmission burst, not just a portion of the still unamplified transmission power is output and supplied to the detector unit 1, as in the previously known solutions, but rather almost the entire output power of the mobile radio terminal operated using the circuit arrangement is applied to said detector unit 1 at the start of the transmission burst, the selectivity and reliability of the detection of the transmitted signal are significantly improved when the detection circuit according to the invention is used.

Figure 2:
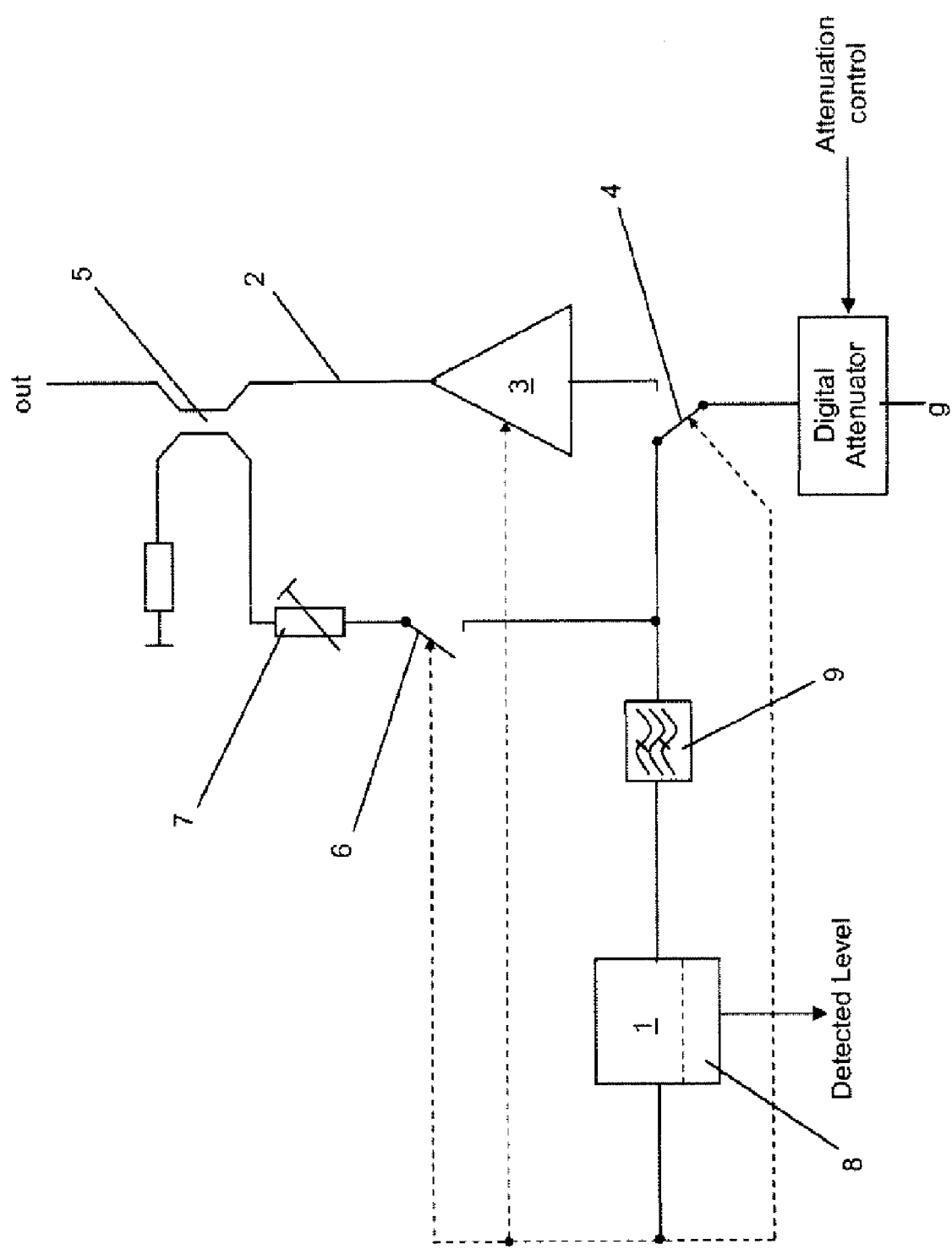
FIG. 2 shows a further embodiment of the invention.

FIG. 2 shows an embodiment of the invention which works fundamentally in the same way and in which the detector unit 1 is additionally in the form of a field strength meter. In this case too, almost the entire transmission power which is output by the mobile radio terminal is initially applied to the detector unit 1 via the switching means 4 at the start of a transmission burst. On account of the self-hold function of the detection circuit that is implemented by means of the functional unit 8, the switching state of the switching means 4, 6 which is adopted under the control of the output signal from the detector unit 1 and the operating state of the transmission power amplifier 3 or the operating state of the entire accessory circuit are retained in all cases until a portion of the detected transmitted signal, amplified by the transmission power amplifier 3 following the changeover of the switching means 4, is applied to the input of the detector unit 1 via the coupling element 5, the attenuation element 7 and the switching means 6. The difference from the embodiment shown in FIG. 1 is merely that the detector unit 1 is in the form of a field strength meter, which means that not only does it detect the presence of a transmitter signal but also it ascertains the level thereof and controls the transmission power amplifier 3 or the gain thereof on the basis of level.

FIG. 3 shows the detail from a detection circuit based on the prior art. As can be seen, in this case a portion of the transmitted power of a mobile radio (not shown) connected on the appliance side is output upstream of the transmission power amplifier 3 by means of a line coupler 5. Since, in this case, the transmitted signal is still unamplified, poor coupling conditions may mean that the level of the output portion of the transmitted signal is under some circumstances so low that it is below the threshold value of the detector unit and therefore the transmitted signal of the mobile radio is not recognized as such by the detector unit 1.

LIST OF REFERENCE SYMBOLS

1 Detector unit
2 Transmission path
3 Transmission power amplifier
4 Switching means
5 Coupling element, line coupler
6 Switching means
7 Actuating element, adjustable attenuation element
8 Functional unit for self-hold function
9 Filter

The invention claimed is:

1. In an accessory circuit for processing or influencing mobile radio signals received from or transmitted by a mobile radio terminal, a detection circuit, comprising:
a detector unit for detecting a signal transmitted from a mobile radio terminal;
the detection circuit forming a part of the accessory circuit and the accessory circuit, upon being prompted by said detector unit, adopting different operating states;
said detector unit, upon detecting a transmitted signal from the mobile radio terminal, activating a circuit portion of the accessory circuit containing at least one transmission power amplifier for amplifying the transmitted signal, the power amplifier remaining deactivated in the absence of a transmitted signal from the mobile radio terminal;
a switching means connected to and driven by said detector unit, said switching means being connected in a transmission path of the accessory circuit, on an input side of the at least one transmission power amplifier;
a coupling element connected on an output side of the transmission power amplifier, wherein, at a start of a transmission burst of a signal transmitted by the mobile radio terminal, the signal is initially applied not to the transmission power amplifier but rather via said switching means to said detector unit, but wherein said detector unit changes over the transmitted signal detected thereby directly to the transmission power amplifier by operating said switching means;
wherein, the detection circuit has a self-holding function, wherein said detector unit causes the accessory circuit to remain in an operating state intended for a presence of a transmitted signal, even after a changeover of said switching means, at least until the transmission power amplifier has turned on and a portion of the transmitted signal that is amplified and output by way of said coupling element connected to the output side of the transmission power amplifier is present at said detector unit.

2. The detection circuit according to claim 1, which comprises a further switching means connected between said coupling element and said detector unit and operated by said detector unit to establish a direct electrical connection between said coupling element and said detector unit only in a presence of a transmitted signal, detected by the detection circuit, from the mobile radio terminal operated using the accessory circuit.

3. The detection circuit according to claim 1, wherein said switching means including the detection circuit in the accessory circuit is connected in a transmission path of the accessory circuit between a duplexer and the transmission power amplifier and via said coupling element connected to an output of the transmission power amplifier.

4. The detection circuit according to claim 1, which comprises a timing element for implementing the self-holding function of the detection circuit, causing the absence of the transmitted signal at the input of said detector unit on account of the changeover of said switching means following detection of the transmitted signal to be recognized by said detector unit only after a delay, wherein that portion of the amplified transmitted signal which is decoupled via said coupling element is already present at said detector unit.

5. The detection circuit according to claim 4, wherein said timing element forms an integral part of said detector unit.

6. The detection circuit according to claim 4, wherein said detector unit is a field strength meter with a threshold value function.

7. The detection circuit according to claim 1, which further comprises an actuating element configured for setting a hysteresis, such that said detector unit recognizes the absence of a transmitted signal if the transmission power which is present at said detector unit is lower than the transmission power which is present at said detector unit at the start of the transmission burst at least by a value determined by the hysteresis.

8. The detection circuit according to claim 7, wherein said actuating element is configured to set a hysteresis of 3 dB.

9. A method of processing or influencing mobile radio signals received from or transmitted by a mobile radio terminal, the method which comprises the following steps:
  detecting a signal transmitted from a mobile radio terminal;
  upon detecting a transmitted signal from the mobile radio terminal, activating a circuit portion of an accessory circuit containing at least one transmission power amplifier for amplifying the transmitted signal, while retaining the power amplifier deactivated in an absence of a transmitted signal from the mobile radio terminal;
  at a start of a transmission burst of the signal transmitted by the mobile radio terminal, initially applying the signal not to the transmission power amplifier but instead via a switching means connected in a transmission path of the accessory circuit, on an input side of the at least one transmission power amplifier to a detector unit for carrying out the detecting step, wherein the detector unit changes over the transmitted signal detected thereby directly to the transmission power amplifier by operating the switching means;
  causing the accessory circuit by way of a self-holding function to remain in an operating state intended for a presence of a transmitted signal, even after a changeover of the switching means, at least until the transmission power amplifier has turned on and a portion of the transmitted signal that is amplified and output to a coupling element connected to an output side of the transmission power amplifier is present at the detector unit.

* * * * *